US 11,576,439 B2

(12) United States Patent
Madera et al.

(10) Patent No.: US 11,576,439 B2
(45) Date of Patent: Feb. 14, 2023

(54) STATION AND METHOD FOR WELDING PARTS OF ELECTRONIC CIGARETTES

(71) Applicant: G.D S.p.A., Bologna (IT)

(72) Inventors: Giovanni Madera, Bologna (IT); Luca Lanzarini, Bologna (IT); Luca Testoni, Bologna (IT); Luca Federici, Bologna (IT)

(73) Assignee: G.D S.p.A., Bologna (IT)

( * ) Notice: Subject to any disclaimer, the term of this patent is extended or adjusted under 35 U.S.C. 154(b) by 299 days.

(21) Appl. No.: 16/768,100

(22) PCT Filed: Nov. 22, 2018

(86) PCT No.: PCT/IB2018/059226
§ 371 (c)(1),
(2) Date: May 29, 2020

(87) PCT Pub. No.: WO2019/106503
PCT Pub. Date: Jun. 6, 2019

(65) Prior Publication Data
US 2020/0288784 A1  Sep. 17, 2020

(30) Foreign Application Priority Data

Dec. 1, 2017 (IT) .......................... 102017000138700

(51) Int. Cl.
*A24F 13/00* (2006.01)
*A24F 17/00* (2006.01)
(Continued)

(52) U.S. Cl.
CPC .............. *A24F 40/70* (2020.01); *A24F 40/42* (2020.01); *B65B 3/04* (2013.01); *B65B 7/2821* (2013.01);
(Continued)

(58) Field of Classification Search
CPC .......... A24F 40/10; A24F 40/42; A24F 40/70; B65B 3/04; B65B 51/10; B65B 7/28;
(Continued)

(56) References Cited

U.S. PATENT DOCUMENTS 4,388,989 A * 6/1983 Edmunds ................. B23Q 7/02
198/346.2
2005/0150191 A1 * 7/2005 Taylor ....................... B65B 3/34
53/471
(Continued)

FOREIGN PATENT DOCUMENTS

EP           2394917 A1    12/2011
WO    WO-2015197846 A1 * 12/2015 ............. B29C 49/36
(Continued)

OTHER PUBLICATIONS

International Search Report and Written Opinion dated Jan. 24, 2019. 13 pages.

*Primary Examiner* — Abdullah A Riyami
*Assistant Examiner* — Thang H Nguyen
(74) *Attorney, Agent, or Firm* — RMCK Law Group PLC

(57) ABSTRACT

A welding station for welding parts of electronic cigarettes includes feeding means, set in a feeding area for feeding parts of electronic cigarettes to be welded; welding means, set in a welding area, downstream of the feeding area, for welding the parts of electronic cigarettes; and a transfer device, set between the feeding means and the welding means for receiving from the feeding means the parts of electronic cigarettes to be welded and transferring them from the feeding area to the welding area. The transfer device includes a first transfer sector and a second transfer sector, pre-arranged for receiving from the feeding means, respectively, first parts and second parts of electronic cigarettes to be welded and transferring them into the welding (Continued)

area. The first transfer sector and the second transfer sector are mobile in rotation about an axis, independently of one another.

12 Claims, 3 Drawing Sheets

(51) Int. Cl.
| | |
|---|---|
| *A24F 25/00* | (2006.01) |
| *A24F 40/70* | (2020.01) |
| *A24F 40/42* | (2020.01) |
| *B65B 3/04* | (2006.01) |
| *B65B 7/28* | (2006.01) |
| *B65G 47/84* | (2006.01) |
| *A24F 40/10* | (2020.01) |

(52) U.S. Cl.
CPC .......... *B65B 7/2878* (2013.01); *B65G 47/846* (2013.01); *A24F 40/10* (2020.01); *B65G 2201/0226* (2013.01)

(58) Field of Classification Search
CPC ................ B65B 7/2821; B65B 7/2878; B65G 2201/0226; B65G 47/846
See application file for complete search history.

(56) References Cited

U.S. PATENT DOCUMENTS

| | | | |
|---|---|---|---|
| 2021/0161198 A1* | 6/2021 | Milandri | ................ A24C 5/397 |
| 2022/0095701 A1* | 3/2022 | Bray | ...................... A24F 40/20 |
| 2022/0125126 A1* | 4/2022 | Boldrini | .................. A24F 40/44 |
| 2022/0132938 A1* | 5/2022 | Boldrini | .................. A24F 40/70 |
| | | | 29/592.1 |

FOREIGN PATENT DOCUMENTS

| | | | | |
|---|---|---|---|---|
| WO | 2016200259 A1 | 12/2016 | | |
| WO | WO-2016200259 A1 * | 12/2016 | ............. | B65B 3/003 |
| WO | 2017051348 A1 | 3/2017 | | |
| WO | WO-2017051348 A1 * | 3/2017 | ........... | A24F 47/008 |

* cited by examiner

STATION AND METHOD FOR WELDING PARTS OF ELECTRONIC CIGARETTES

CROSS-REFERENCE TO RELATED APPLICATIONS

This application is a 371 National Stage of International Application No. PCT/162018/059226, filed Nov. 22, 2018, which claims priority to Italian Patent Application No. 102017000138700, filed Dec. 1, 2017. The disclosure of each of the above applications is incorporated herein by reference in its entirety.

The present invention falls within the technical sector of electronic cigarettes. In particular, the invention regards a station and a method for welding parts of electronic cigarettes.

Recently, the production of electronic cigarettes is becoming increasingly automated. In particular, automatic machines are provided comprising stations dedicated to operations that may be even very different from one another, such as assembly of the various parts together, control of the assembled sets, filling of the cartridges with the liquid to be vaporized, plugging of the cartridges, welding of the plugs to the cartridges, etc.

The diversity of operations to be performed also entails different times of stay of the components in the various stations. In particular, the operations of welding together of the components requires significantly long times. In fact, for technical reasons, the operations of sss welding (such as ultrasonic welding of each plug to each cartridge) require in the majority of cases stoppage of the parts to be welded in the welding station.

For this reason, it is complicated to maintain a high throughput of the above machines, i.e., to integrate in an efficient way the welding operations in the machines themselves.

The object of the present invention is to overcome the drawback outlined above.

The above object is achieved by a station and a method for welding parts of electronic cigarettes according to the annexed claims.

Advantageously, the welding station and welding method proposed by the present invention guarantee a high throughput and the possibility of integrating in an efficient way the welding operations with other operations (for example, in an automatic machine).

The above and other advantages will become more evident from the ensuing treatment, with the aid of the attached plates of drawings, wherein.

Figure 1:
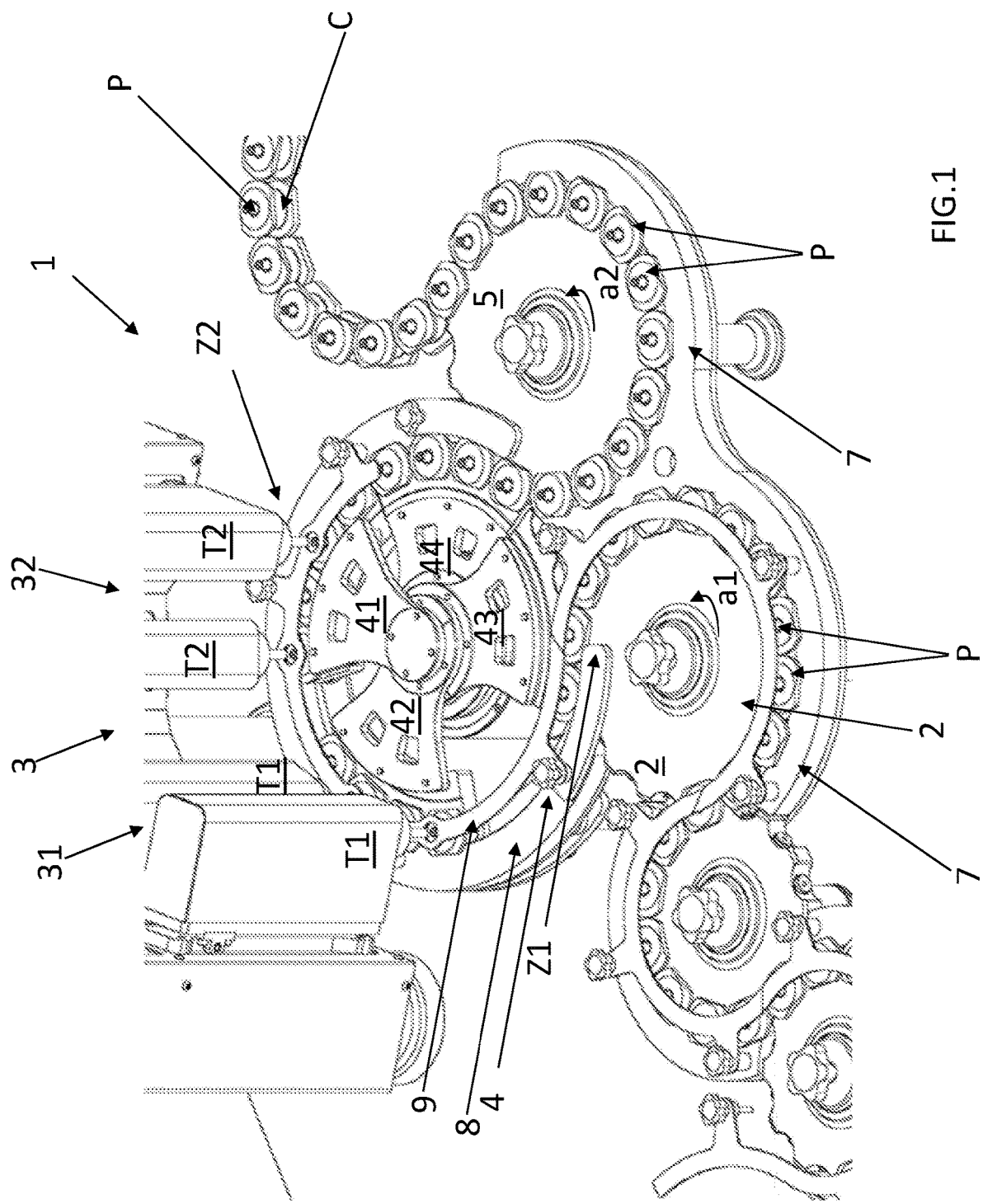
FIG. 1 is a perspective view of a station for welding parts of electronic cigarettes according to the present invention.

It is pointed out that, in the present treatment, the expression "parts of electronic cigarettes" is intended to indicate those elements/components that, in general, are to be joined together to form an electronic cigarette, or in any case, a part of an electronic cigarette (such as, parts of electrical/electronic circuits, connection terminals, cartridges and plugs, etc.).

With reference to the attached drawings, designated by the reference number 1 is a station for welding parts of electronic cigarettes P according to the present invention.

The welding station 1 comprises: feeding means 2, set in a feeding area Z1 for feeding parts of electronic cigarettes P to be welded; and welding means 3 (illustrated in FIGS. 1 and 1A), set in a welding area Z2, downstream of the feeding area Z1 (for example, with respect to a pre-set conveying path), for welding the parts of electronic cigarettes P.

The welding station 1 further comprises a transfer device 4, set between the feeding means 2 and the welding means 3 and pre-arranged for receiving from the feeding means 2 the parts of electronic cigarettes P to be welded and transferring them from the feeding area Z1 to the welding area Z2 (where they are welded by the welding means 3).

In particular, the transfer device 4 comprises: at least one first transfer sector 41 and one second transfer sector 42, which are pre-arranged for receiving, each, from the feeding means 2, respectively first parts P1 and second parts P2 of electronic cigarettes P to be welded (represented in FIG. 1A) and transferring them from the feeding area Z1 into the welding area Z2. It is pointed out that the expressions "first parts of electronic cigarettes" and "second parts of electronic cigarettes" are meant to indicate two distinct sets each formed by at least two parts of electronic cigarettes P, which are to be welded together. These expressions will be used in what follows only when it becomes necessary to provide a clear-cut distinction between the two sets of parts of electronic cigarettes; otherwise, the generic expression "parts of electronic cigarettes" will be used.

Figure 1A:
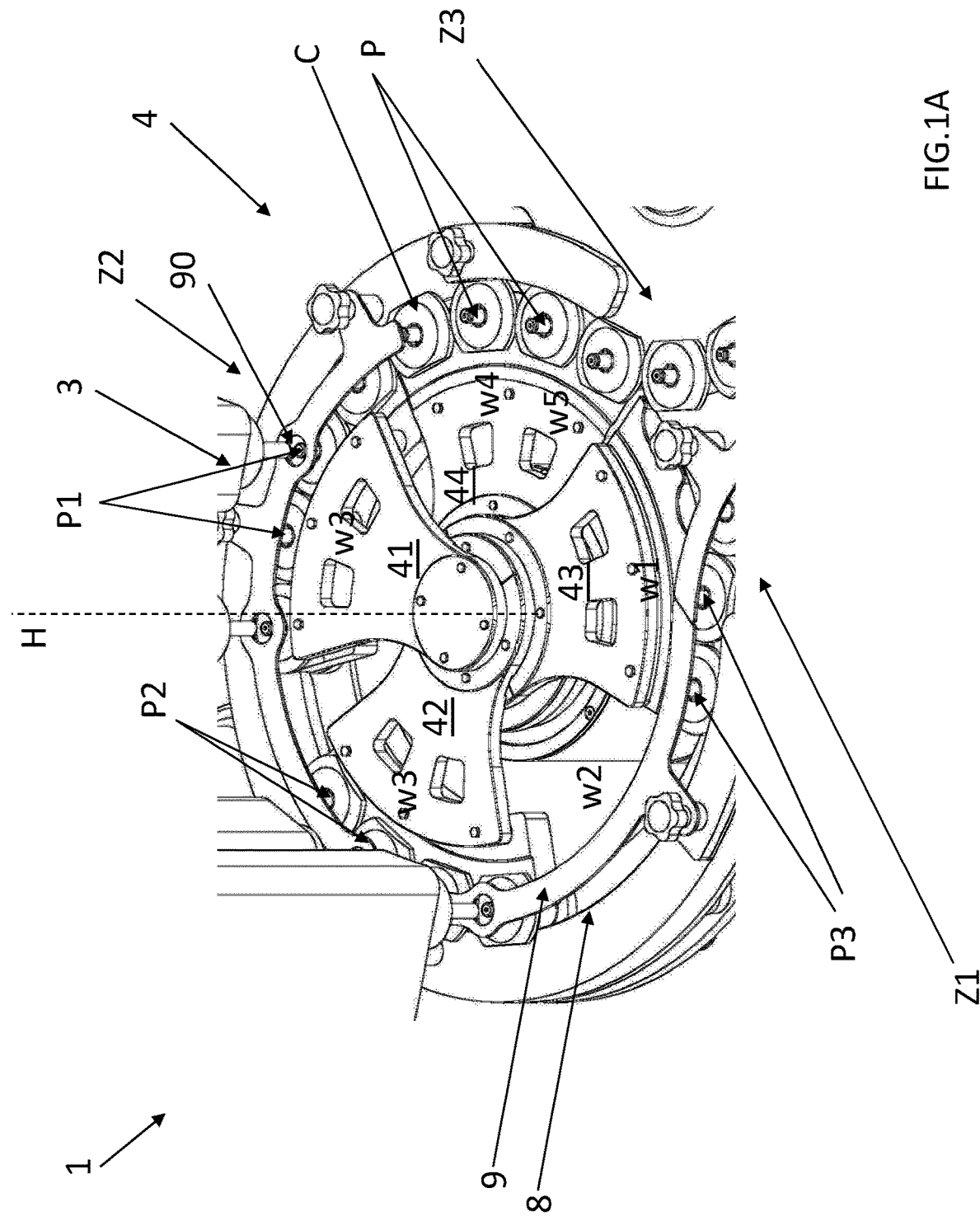
FIG. 1A is an enlarged view of a detail of FIG. 1.
Figure 2:
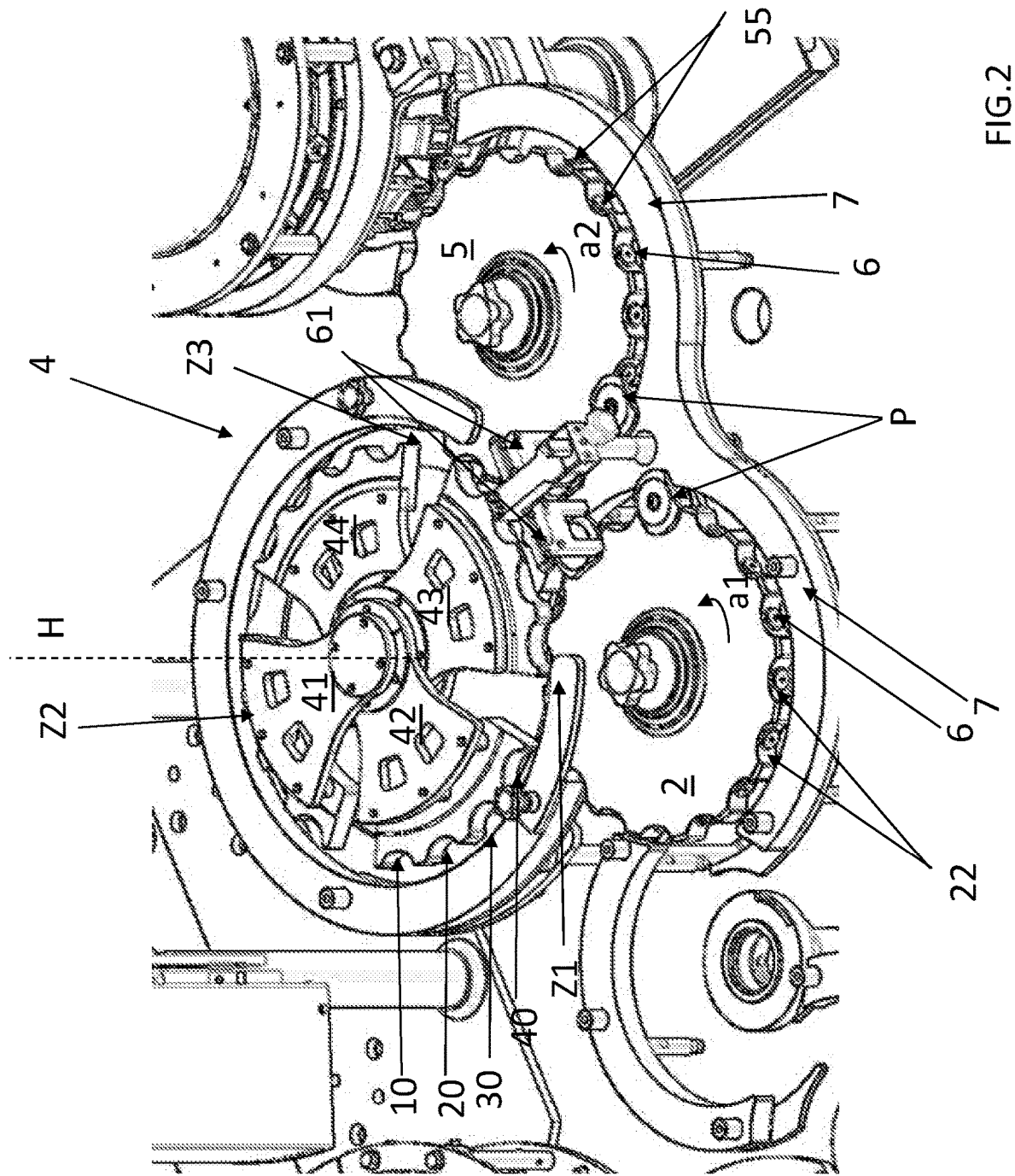
FIG. 2 is a perspective view of a station for welding parts of electronic cigarettes according to the present invention, enlarged and with a degree of detail different from that of the view of FIG. 1.

In particular, the first transfer sector 41 and the second transfer sector 42 are mobile in rotation about an axis H (preferably about one and the same axis H, represented by way of example in FIGS. 1A and 2), in a way independent of one another, at a reception (angular) speed w1 when they are in the feeding area Z1, at a welding (angular) speed w2 when they are in the welding area Z2, and at a transfer (angular) speed w3, higher than the reception speed w1 and the welding speed w2, when they are between the feeding area Z1 and the welding area Z2 (i.e., after they have received the parts of electronic cigarettes P and before the latter have been welded).

In other words, the first transfer sector 41 receives the first parts P1 of electronic cigarettes P when it is in the feeding area Z2 at the reception speed w1 and then accelerates, during the corresponding (rotational) movement from the feeding area Z1 to the welding area Z2, up to the transfer speed w3. Then, in the welding area Z2, the first transfer sector 41 decelerates down to the welding speed w2 to enable action by the welding means 3 on the first parts P1 of electronic cigarettes P.

The same applies for the second transfer sector 42, which receives the second parts P2 of electronic cigarettes P, which, for example, are supplied by the feeding means 2 consecutively with respect to the first parts P1 of electronic cigarettes P to be welded.

It is pointed out that the rotational speeds mentioned above (and the rotational speeds that will be mentioned in what follows) are indicated in the figures (in particular in FIGS. 1A and 2) only by way of clarification, in the corresponding reference areas.

Advantageously, the welding station 1 proposed by the invention guarantees a high throughput and, consequently, makes it possible to integrate the welding station 1 itself in an automatic machine and/or line in an efficient way.

In detail, the presence of the first transfer sector 41 and of the second transfer sector 42, which are mobile in a way independent of one another and accelerate after they have received the parts of electronic cigarettes P to be welded and before they have reached the welding area Z2, makes it possible to reduce the total times of stay of the parts of electronic cigarettes P in the welding station 1 itself. In fact, as is known, the operations of welding parts of electronic cigarettes P require significantly long times, which have a bearing on the throughput of the welding station 1 itself and of the automatic machine/line where the station 1 may possibly be integrated. Since these times are "technical times" that cannot be reduced, with the welding station 1 proposed, these technical times are compensated for by an acceleration of the first transfer sector 41 and of the second transfer sector 42 while they are moving between the feeding area Z1 and the welding area Z2. In addition, also the times necessary for feeding the first parts P1 and second parts P2 of electronic cigarettes P to be welded by the feeding means 2 to the first transfer sector 41 and to the second transfer sector 42 are compensated.

Preferably, the reception speed w1 of the first transfer sector 41 and of the second transfer sector 42 is higher than zero. In other words, the first transfer sector 41 and the second transfer sector 42 receive the parts (first parts P1 and second parts P2) of electronic cigarettes P to be welded while these are moving. Advantageously, in this way, the times of stay of the parts of electronic cigarettes P in the welding station 1 are further reduced. The reception speed w1 is in any case lower than the transfer speed w3, in so far as it must be such as to enable transfer of the parts of electronic cigarettes P to be welded from the feeding means 2 to the first transfer sector 41 and to the second transfer sector 42.

Alternatively, the reception speed w1 of the first transfer sector 41 and of the second transfer sector 42 may be equal to zero.

Preferably, the reception speed w1 of the first transfer sector 41 and of the second transfer sector 42 is higher than the welding speed w2 of the first transfer sector 41 and of the second transfer sector 42.

For example, the welding speed w2 of the first transfer sector 41 and of the second transfer sector 42 is equal to zero. In other words, once the first transfer sector 41 and the second transfer sector 42 have received the parts of electronic cigarettes P to be welded, they accelerate as already described above and then decelerate until they stop in the welding station 1 (as in the case illustrated). The stop of the first transfer sector 41 and second transfer sector 42 in the welding area Z2 has a duration at least equal to the minimum time sufficient for enabling welding of the parts of electronic cigarettes P (in particular, welding together of at least two parts). For example, in the case of ultrasonic welding, the above minimum time is approximately 500 s.

As an alternative to what has been described above, according to a variant not illustrated, the welding speed of the first transfer sector and second transfer sector is different from zero. In other words, once the first transfer sector and the second transfer sector have received the parts of electronic cigarettes to be welded, they accelerate as already described above and then decelerate in the welding station, remaining in any case in motion. In this case, the welding means are able to follow, i.e., to move in a way concordant with, that is, in the same direction as, the parts of electronic cigarettes to be welded, and to move in the opposite direction following upon the welding operations.

According to the preferred embodiment illustrated, the welding station 1 comprises, in addition to what has been described previously, output means 5 (visible in FIGS. 1 and 2), which are set in an output area Z3, downstream of the welding area Z2 (for example, with respect to the same conveying path mentioned above), and are pre-arranged for receiving the parts of electronic cigarettes P that have been welded and carrying them away, in an output direction, at a conveying speed a2. In this case, the first transfer sector 41 and the second transfer sector 42 are moreover mobile (in rotation about the aforesaid axis H) from the welding area Z2 to the output area Z3, for transferring the parts of electronic cigarettes P that have been welded to the output means 5.

In particular, the first transfer sector 41 and the second transfer sector 42 move at an output (angular) speed w4, which is higher than the welding speed w2, when they are between the welding area Z2 and the output area Z3, and at a release (angular) speed w5, lower than the output speed w4, when they are in the output area Z3. In other words, once the parts of electronic cigarettes P have been welded, the first transfer sector 41 and the second transfer sector 42 accelerate up to the output speed w4 until they reach the output area Z3, where they decelerate down to the release speed w5 for enabling the output means 5 to receive the parts of electronic cigarettes P that have been welded. In this way, the technical times necessary both for welding and for transfer of the parts of electronic cigarettes P that have been welded to the output means 5 are further compensated.

Preferably, the feeding means 2 feed the parts of electronic cigarettes P to be welded at a feeding speed a1 that is equal to the reception speed w1 of the first transfer sector 41 and of the second transfer sector 42. In other words, during feed of the parts of electronic cigarettes P to be welded, the feeding means 2 move at a feeding speed a1 equal to (or at least comparable with) the reception speed w1 at which the first transfer sector 41 and the second transfer sector 42 move in the feeding area Z1.

Advantageously, this characteristic guarantees correct and optimal transfer of the parts of electronic cigarettes P to be welded from the feeding means 2 to the first 41 and second 42 transfer sectors.

According to a variant not illustrated, the feeding means are linearly mobile. In this case, the feeding speed is equal to the tangential (i.e., peripheral) reception speed of the first and second transfer sectors.

In the preferred embodiment illustrated in the attached drawings (see, in particular, FIGS. 1 and 2), the feeding means 2 comprise a wheel 2 (or a star device, or in any case a feeding device rotatable about an axis), and the corresponding feeding (angular) speed a1 is equal to the reception (angular) speed w1 of the first transfer sector 41 and of the second transfer sector 42.

Preferably, the output means 5 receive the parts of electronic cigarettes P that have been welded at a conveying speed a2 that is equal to the release speed w5 of the first transfer sector 41 and of the second transfer sector 42. In other words, during reception of the parts of electronic cigarettes P that have been welded, the output means 5 move at a conveying speed a2 that is equal to the release speed w5 at which the first transfer sector 41 and the second transfer sector 42 move in the output area Z3.

Advantageously, this characteristic guarantees correct and optimal transfer of the parts of electronic cigarettes P that have been welded from the first 41 and second 42 transfer sectors to the output means 5.

According to a variant (not illustrated), the output means are linearly mobile. In this case, the conveying speed is equal to the tangential (i.e., peripheral) release speed of the first and second transfer sectors.

In the preferred embodiment illustrated in the attached drawings (see, in particular, FIGS. 1 and 2), the output means 5 comprise a wheel 5 (or a star device, or in any case a feeding device rotatable about an axis), the conveying (angular) speed a2 of which is equal to the release (angular) speed w5 of the first transfer sector 41 and of the second transfer sector 42.

Preferably, the release speed w5 is equal to the reception speed w1.

With reference to the example illustrated, the wheels 2, 5 of the feeding means 2 and/or of the output means 5 mentioned above each comprise housings 22, 55 (visible in FIG. 2) that are each configured to receive parts of electronic cigarettes P to be welded (for example, set within a supporting container C, also referred to as "godet", as will be better clarified in what follows).

The wheels 2, 5 of the feeding means 2 and/or of the output means 5 mentioned above may each comprise withholding means 6 (for example, suction pads and/or a negative-pressure source) for withholding the parts of electronic cigarettes P (see FIG. 2).

With reference to the attached drawings, the welding station 1 further comprises first guide means 7, which in turn comprise, for example, at least one side 7 that defines a semi-circular profile for guiding the parts of electronic cigarettes P in the welding station 1, and in particular as they are travelling towards the transfer device 4, on the feeding means 2 (wheel 2), and/or at output from the transfer device 4, on the output means 5 (wheel 5). In this way, the parts of electronic cigarettes P are withheld between the housings 22, 55 of the wheels 2, 5 of the feeding means 2 and/or of the output means 5 and the first guide means 7.

The first guide means 7 may be present as an alternative to, or together with, the withholding means 6 described above (as in the case illustrated).

According to the embodiment represented, the first transfer sector 41 and the second transfer sector 42 each comprise at least one first housing 10 (preferably more than one), which receives the (first P1 and second P2) parts of electronic cigarettes P to be welded (which are, for example, also in this case, set within a supporting container C); see, in particular, FIG. 2.

According to the embodiment illustrated, the parts of electronic cigarettes P remain within the respective housing 10 also during welding thereof, i.e., also in the welding area Z2.

For example, the first transfer sector 41 and the second transfer sector 42 are substantially shaped like a circular sector and have the aforesaid housings 10 arranged in the respective peripheral edge shaped like an arc of a circumference.

According to a variant not illustrated, the first transfer sector and the second transfer sector may comprise withholding means, such as negative-pressure means and/or suction pads, for withholding the parts of electronic cigarettes to be welded.

In the case illustrated, the welding station 1 further comprises second guide means 8, which in turn comprise, for example, a side 8 that defines a semi-circular profile for guiding the parts of electronic cigarettes P as they are travelling in the area of the transfer device 4 (see, in particular, FIGS. 1 and 1A). In this way, the parts of electronic cigarettes P are withheld between the housings 10 of the first transfer sector 41 and second transfer sector 42 and the second guide means 8.

The second guide means 8 may be present as an alternative to, or together with, the withholding means described above.

With reference to FIGS. 1 and 1A, the welding station 1 further comprises top-containment means 9 (illustrated only partially), which, for example, in the specific case, comprise a side 9 and are arranged above the parts of electronic cigarettes P travelling in the welding station 1 so as to prevent undesirable movements (in a direction transverse to the conveying direction) of the latter that might modify the orientation thereof. If the parts of electronic cigarettes P are set in the supporting containers C, as in the case illustrated, these undesirable movements could even cause exit of the parts of electronic cigarettes P from the containers C themselves.

Once again with reference to FIGS. 1 and 1A, in the welding area Z2, the side 9 has openings 90 such as to enable the action of the welding means 3 on the parts of electronic cigarettes P to be welded.

Preferably, with particular reference to FIG. 1, the welding means 3 comprise at least one welding head T1, T2, which, when the parts of electronic cigarettes P to be welded are in the welding area Z2, is mobile in the direction of the parts of electronic cigarettes P to be welded, for example with a vertical movement from above downwards.

According to the preferred embodiment illustrated, the welding station 1 further comprises at least one third transfer sector 43 shaped and mobile in a way similar to the first transfer sector 41 and second transfer sector 42 and independent of the first transfer sector 41 and second transfer sector 42.

The first 41, second 42, and third 43 transfer sectors each comprise at least one first housing 10 and one second housing 20, adjacent to one another, for receiving each parts of electronic cigarettes P to be welded (see FIG. 2, where the reference numbers of the housings 10, 20, for reasons of clarity, are indicated only at the second transfer sector 42).

In addition, according to this embodiment, the welding means 3 comprise: at least one first welding unit 31, which is set in the welding area Z2 and in turn comprises at least one welding head T1; and at least one second welding unit 32, which is set in the welding area Z2 at a certain distance from the first welding unit 31 (for example, downstream of the first welding unit 31 with reference to the conveying path of the parts of electronic cigarettes P in the welding station 1) and comprises at least one welding head T2 (see FIG. 1). In particular, the first welding unit 31, the second welding unit 32, and the transfer sectors 41, 42, 43 (first, second, and third transfer sectors) are pre-arranged so that the welding head T1 of the first welding unit 31 welds the parts of electronic cigarettes P set in the first housing 10 of each transfer sector 41, 42, 43 (first, second, and third transfer sectors), while the welding head T2 of the second welding unit 32 welds the parts of electronic cigarettes P set in the second housing 20 of each transfer sector 41, 42, 43.

In other words, when a transfer sector 41, 42, 43 (first, second, or third transfer sector) reaches the welding area Z2, the parts of electronic cigarettes P set in the corresponding first housing 10 are welded by the welding head T1 of the first welding unit 31. Then, the transfer sector 41, 42, 43 moves, still in the welding area Z2, into a position corresponding to the second welding unit 32, and the parts of electronic cigarettes P set in the corresponding second housing 20 are welded by the welding head T2 of the second welding unit 32.

This embodiment is advantageous in so far as the welding heads T1, T2 present considerable overall dimensions, and hence welding of the parts of electronic cigarettes P set within mutually adjacent housings 10, 20 of one and the same (first, second, or third) transfer sector 41, 42, 43 would be problematical.

In the aforesaid case, for example, the welding speed w2 of the first 41, second 42, and third 43 transfer sectors is zero when they are in a position corresponding to the first welding unit 31 and the second welding unit 32, whereas it is different from zero in the stretch of path between the two (first and second) welding units 31, 32.

With particular reference to FIG. 1A, while the first 41 and second 42 transfer sectors are set in a position corresponding to the first 31 and second 32 welding units, the third transfer sector 43 receives third parts P3 of electronic cigarettes P to be welded in the feeding area Z1 from the feeding means 2. Advantageously, the presence of the third transfer sector 43 guarantees continuity of feed of the parts of electronic cigarettes P by the feeding means 2.

With reference to the preferred embodiment illustrated in the attached drawings, the first 41, second 42, and third 43 transfer sectors each comprise four housings 10, 20, 30, 40 (first, second, third, and fourth housings), arranged in a row adjacent to one another (the first 10 and the second 20 adjacent to one another, the second 20 and the third 30 adjacent to one another, and the third 30 and the fourth 40 adjacent to one another); see in detail FIG. 2, where the reference numbers of the housings 10, 20, 30, 40, for reasons of clarity, are indicated only for the second transfer sector 42.

In this embodiment, the first welding unit 31 comprises two welding heads T1, and the second welding unit 32 comprises two welding heads T2. In this case, the welding heads T1 of the first welding unit 31 weld the parts of electronic cigarettes P set in the first housing 10 and third housing 30 of each transfer sector 41, 42, 43, and the welding heads T2 of the second welding unit 32 weld the parts of electronic cigarettes P set in the second housing 20 and fourth housing 40 of each transfer sector 41, 42, 43. Advantageously, this embodiment guarantees an even higher throughput of the welding station 1.

With reference to the preferred embodiment illustrated in the attached drawings, the transfer device 4 further comprises a fourth transfer sector 44, shaped and mobile like the first 41, second 42, and third 43 transfer sectors (see the foregoing description). The four transfer sectors 41, 42, 43, 44 are all independent of one another. With reference to FIGS. 1 and 1A, the first transfer sector 41 is located in the welding area Z2 in a position corresponding to the second welding unit 32, the second transfer sector 42 is located in the welding area Z2 in a position corresponding to the first welding unit 31, the third transfer sector 43 is located in the feeding area Z1, while the fourth transfer sector is located between the welding area Z2 and the output area Z3.

Clearly, the number of transfer sectors, as likewise the number of the corresponding housings, may vary according to the needs. Consequently, with reference to the embodiment described previously, also the number of welding heads of each welding unit (and the number of welding units) may vary.

The type of the welding means 3 may vary according to the type of the parts of electronic cigarettes P to be welded.

For example, in the case of welding of plastic components, the welding means 3 may comprise at least one ultrasonic-welding head (sonotrode) and, preferably, contrast means for providing a contrast surface for the ultrasonic-welding head during its operation. This type of welding may be used, for example, for welding the plugs to the corresponding cartridges.

Alternatively, in the case of welding of conductive and ferromagnetic components, the welding means 3 may comprise at least one induction-welding head.

According to another alternative, in the case of welding of metal components, the welding means 3 may comprise at least one laser-welding head.

Once again according to a different example, the welding means 3 may comprise at least one heat-sealing head, understood as a head for enabling heat staking. This type of welding may be used, for example, during assembly of the electrical/electronic circuits.

The welding station 1 may further comprise inspection means 61, set, for example, upstream and/or downstream of the welding area Z2 (see FIG. 2). The inspection means 61 are, for example, means for checking the presence of the parts of electronic cigarettes P to be welded (upstream of the welding area Z2) and of the parts of electronic cigarettes P that have been welded (downstream of the welding area Z2).

The inspection means 61 arranged downstream of the welding area Z2 may comprise, in addition or as an alternative to the means for checking the presence, means for control of the quality of the weld made.

As already mentioned previously, in the case illustrated, the parts of electronic cigarettes P are set within the supporting containers C (also known as "godets") inside which they are conveyed throughout the conveying path in the welding station 1. Use of the above supporting containers C is preferable in so far as the parts (or components) of electronic cigarettes P (such as the cartridges illustrated by way of example in the annexed drawings) are of small dimensions, in some cases are brittle, or in any case may be unstable, a fact that would render problematical conveying thereof and execution of the corresponding welding operations.

Alternatively, according to a variant not illustrated, the parts of electronic cigarettes P may be conveyed in the welding station even in the absence of the aforesaid supporting containers: in this case, the entire welding station (and, in particular, the feeding means, the transfer sectors, the first and second guide means, and the output means) must be appropriately shaped and configured accordingly.

According to another alternative embodiment, which is not illustrated either, during part of their path in the welding station, the cartridges of electronic cigarettes may be set in the supporting containers, whereas they may be conveyed without the supporting containers while they are travelling along another part of the path.

The welding station 1 described above may be integrated in a machine for filling and/or assembling electronic cigarettes.

The present invention also regards a machine for filling cartridges of electronic cigarettes (not illustrated), comprising at least: a station for filling cartridges of electronic cigarettes, where cartridges of electronic cigarettes are filled with a product (for example, in liquid or powder form); and a station for plugging the cartridges, where the cartridges that have been filled are plugged (i.e., a closing element is fitted on the cartridges, so as to close them). In particular, the machine comprises a welding station 1 as described above for welding the plugs to the corresponding cartridges (preferably via ultrasonic means).

The present invention also regards a machine (not illustrated) for assembling electronic cigarettes, comprising at least one first station for assembling parts of electronic cigarettes and one second station for assembling parts of electronic cigarettes, where at least the latter is constituted by a welding station 1 for parts of electronic cigarettes as described above.

The invention moreover regards a method for welding parts of electronic cigarettes P, which may, for example, be implemented by means of the welding station 1 described previously.

The method according to the invention comprises the steps of:
- feeding first parts P1 and then second parts P2 of electronic cigarettes P to be welded in a feeding area Z1;
- receiving the first parts P1 and then the second parts P2 of electronic cigarettes P to be welded in the feeding area Z1;
- transferring the first parts P1 and then the second parts P2 of electronic cigarettes P to be welded from the feeding area Z1 to a welding area Z2; and
- welding the first parts P1 and then the second parts P2 of electronic cigarettes P in the welding area Z2.

In particular, during the step of receiving the first parts P1 and second parts P2 of electronic cigarettes P to be welded in the feeding area Z1, the parts of electronic cigarettes P are moved at a reception speed w1. Moreover, during the step of transferring the first parts P1 and second parts P2 of electronic cigarettes P to be welded from the feeding area Z1 to the welding area Z2, the parts of electronic cigarettes P are accelerated from the reception speed w1 to a transfer speed w3. Furthermore, during the step of welding the first parts P1 and second parts P2 of electronic cigarettes P in the welding area Z2, the parts of electronic cigarettes P are decelerated from the transfer speed w3 to a welding speed w2.

The welding method proposed by the present invention affords the same advantages as the welding station 1 described previously. In fact, in a way similar to what has already been said for the welding station 1, with the method proposed a high throughput of the welding operations is guaranteed.

In detail, the fact that the first parts P1 and second parts P2 of electronic cigarettes P are received and then accelerated prior to welding thereof, makes it possible to reduce the total times for processing the parts of electronic cigarettes P themselves as compared to known methods. In fact, as has already been said, the operations of welding parts of electronic cigarettes P require significantly long times, which have a bearing on the overall throughput; these times cannot be reduced, but can only be compensated for during transfer of the parts of electronic cigarettes P towards the welding area Z2, and this is obtained by accelerating their movement up to the transfer speed w3.

Preferably, the method according to the invention comprises, following upon the step of welding the first parts P1 and second parts P2 of electronic cigarettes P in the welding area Z2, the step of transferring the first parts P1 and then the second parts P2 of electronic cigarettes P towards an output area Z3 at an output speed w4.

The method further comprises the step of releasing the parts of electronic cigarettes P at a release speed w5 and carrying them away at a conveying speed a2. In particular, the output speed w4 is higher than the welding speed w2 and the release speed w5.

Advantageously, in this way, it is possible to compensate further for the times necessary for welding, as described previously.

As regards the values of the feeding speed a1, the reception speed w1, the transfer speed w3, the welding speed w2, the output speed w4, the release speed w5, and the conveying speed a2 and the relations between them, reference may be made to what has already been said in the foregoing description concerning the welding station 1.

The invention claimed is:

1. A station (1) for welding parts of electronic cigarettes (P), comprising:
   - feeding means (2), set in a feeding area (Z for feeding parts of electronic cigarettes (P) that are to be welded;
   - welding means (3), set in a welding area (Z2 downstream of the feeding area (Z1), for welding the parts of electronic cigarettes (P); and
   - a transfer device (4), set between the feeding means (2) and the welding means (3) and pre-arranged for receiving from the feeding means (2) the parts of electronic cigarettes (P) to be welded and transferring them from the feeding area (Z1) to the welding area (Z2), said transfer device (4) including:
     - at least one first transfer sector (41) and one second transfer sector (42), which are pre-arranged for receiving from the feeding means (2) respectively first parts (P1) and second parts (P2) of the parts of electronic cigarettes (P) that are to be welded and transferring them into the welding area (Z2);
     - wherein the first transfer sector (41) and the second transfer sector (42) are mobile in rotation about an axis (H), independently of one another, at a reception speed (w1) when they are in the feeding area (Z1), at a welding speed (w2) when they are in the welding area (Z2), and at a transfer speed (w3), higher than the reception speed (w1) and the welding speed (w2), when they are between the feeding area (Z1) and the welding area (Z2); and
     - at least one third transfer sector (43);
   wherein:
     - the first (41), second (42), and third (43) transfer sectors each comprise at least one first housing (10) and one second housing (20) adjacent to one another for receiving the parts of electronic cigarettes (P) that are to be welded;
     - the welding means (3) comprise at least one first welding unit (31), which includes at least one welding head (T1); and at least one second welding unit (32), which includes at least one welding head (T2) and is set at a certain distance from the first welding unit (31); and
     - the first welding unit (31), the second welding unit (32), and the transfer sectors (41, 42, 43) are mutually pre-arranged so that the welding head (T1) of the first welding unit (31) will weld the parts of electronic cigarettes (P) set in the first housing (10) of each transfer sector (41, 42, 43), and the welding head (T2) of the second welding unit (32) will weld the parts of electronic cigarettes (P) set in the second housing (20) of each transfer sector (41, 42, 43).

2. The welding station (1) according to claim 1, wherein the reception speed (w1) of the first transfer sector (41) and of the second transfer sector (42) is higher than the welding speed (w2) of the first transfer sector (41) and of the second transfer sector (42).

3. The welding station (1) according to claim 1, wherein the welding speed (w2) of the first transfer sector (41) and of the second transfer sector (42) is equal to zero.

4. The welding station (1) according to claim 1, wherein the feeding means (2) comprise a wheel (2) that supplies the parts of electronic cigarettes (P) that are to be welded at a feeding speed (a1) that is equal to the reception speed (w1) of the first transfer sector (41) and of the second transfer sector (42).

5. The welding station (1) according to claim 1, further comprising output means (5), which are set in an output area (Z3), downstream of the welding area (Z2) and are prearranged for receiving the parts of electronic cigarettes (P) that have been welded and carrying them away at a conveying speed (a2);

wherein:
the first transfer sector (41) and the second transfer sector (42) are mobile in rotation about the axis (H) from the welding area (Z2) to the output area (Z3) for transferring the first parts (P1) and second parts (P2) that have been welded to the output means (5); and
the first transfer sector (41) and the second transfer sector (42) are mobile at an output speed (w4), which is higher than the welding speed (w2), when they are between the welding area (Z2) and the output area (Z3), and at a release speed (w5), lower than the output speed (w4), when they are in the output area (Z3).

6. The welding station (1) according to claim 5, wherein the output means (5) comprise a wheel (5), and wherein the conveying speed (a2) is equal to the release speed (w5) of the first transfer sector (41) and of the second transfer sector (42).

7. The welding station (1) according to claim 1, wherein the welding means (3) comprise ultrasonic-welding means, or laser-welding means, or induction-welding means, or heat-sealing means.

8. The welding station (1) according to claim 1, wherein the parts of electronic cigarettes (P) are moved in the welding station (1) arranged within supporting containers (C).

9. A machine for filling cartridges of electronic cigarettes, comprising:
a station for filling of the cartridges of electronic cigarettes, where cartridges are filled with a product;
a station for plugging the cartridges with a plug, where filled cartridges are plugged; and
a welding station (1) for welding the plugs to the corresponding cartridges according to claim 1.

10. A machine for assembling parts of electronic cigarettes (P), comprising:
a first station for assembling the parts of electronic cigarettes (P); and
a second station for assembling the parts of electronic cigarettes (P), constituted by a welding station (1) according to claim 1.

11. A method for welding parts of electronic cigarettes (P), comprising the steps of:
feeding first parts (P1) and then second parts (P2) of the parts of electronic cigarettes (P) that are to be welded in a feeding area (Z1);
receiving the first parts (P1) and then the second parts (P2) that are to be welded in the feeding area (Z1);
transferring the first parts (P1) and then the second parts (P2) that are to be welded from the feeding area (Z1) to a welding area (Z2); and
welding the first parts (P1) and then the second parts (P2) that are to be welded in the welding area (Z2), wherein:
during the step of receiving the first parts (P1) and the second parts (P2) that are to be welded in the feeding area (Z1), the first parts (P1) and the second parts (P2) are moved at a reception speed (w1);
during the step of transferring the first parts (P1) and second parts (P2) that are to be welded from the feeding area (Z1) to the welding area (Z2), the first parts (P1) and the second parts (P2) are accelerated from the reception speed (w1) to a transfer speed (w3);
during the step of welding the first parts (P1) and second parts (P2) in the welding area (Z2), the first parts (P1) and the second parts (P2) are decelerated from the transfer speed (w3) to a welding speed (w2).

12. The method according to claim 11, comprising:
providing in said welding area (Z2) at least one first welding unit (31), which includes at least one welding head (T1), and at least one second welding unit (32), which includes at least one welding head (T2) and is set at a certain distance from the first welding unit (31), wherein:
in said transferring and welding steps, said first parts (P1) and second parts (P2) that are to be welded are received, respectively, in at least one first transfer sector and one second transfer sector (41, 42, 43) mobile in rotation about an axis (H), independently of one another, each sector comprising at least one first housing (10) and one second housing (20) adjacent to one another, where each of the housings (10, 20) receive respective first parts (P1) and second parts (P2) that are to be welded, and
in said welding step, the welding head (T1) of the first welding unit (31) welds the first parts (P1) set in the first housing (10) of each transfer sector (41, 42, 43), and the welding head (T2) of the second welding unit (32) welds the second parts (P2) set in the second housing (20) of each transfer sector (41, 42, 43).

* * * * *